United States Patent
Kronner et al.

(10) Patent No.: US 6,902,020 B2
(45) Date of Patent: Jun. 7, 2005

(54) INTERIOR VEHICLE BATTERY SYSTEM AND METHOD

(75) Inventors: Walter J Kronner, Sterling Heights, MI (US); Robert E Tilley, Waterford, MI (US); James E Van Hout, Auburn Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 85 days.

(21) Appl. No.: 10/207,447

(22) Filed: Jul. 29, 2002

(65) Prior Publication Data

US 2004/0016580 A1 Jan. 29, 2004

(51) Int. Cl.[7] .............................................. B60R 16/04
(52) U.S. Cl. ................................................... 180/68.5
(58) Field of Search ........................ 180/68.5, 65.1, 180/65.3; 429/99, 100, 163

(56) References Cited

U.S. PATENT DOCUMENTS

| | | | | |
|---|---|---|---|---|
| 4,074,785 A | * | 2/1978 | Masevice ................... | 180/68.5 |
| 4,577,720 A | * | 3/1986 | Hamane et al. ............ | 180/229 |
| 4,840,855 A | * | 6/1989 | Foti et al. .................. | 429/120 |
| 5,004,081 A | * | 4/1991 | Custer ....................... | 180/68.5 |
| 5,392,873 A | * | 2/1995 | Masuyama et al. ........ | 180/68.5 |
| 5,490,572 A | | 2/1996 | Tajiri et al. | |
| 5,547,125 A | | 8/1996 | Hennessee et al. | |
| 5,620,057 A | * | 4/1997 | Klemen et al. ............ | 180/68.5 |
| 5,647,534 A | | 7/1997 | Kelz et al. | |
| 5,704,644 A | * | 1/1998 | Jaggi ......................... | 280/796 |
| 5,709,280 A | * | 1/1998 | Beckley et al. ............ | 180/68.5 |
| 5,730,237 A | * | 3/1998 | Matsuki et al. ............ | 180/65.1 |
| 5,839,656 A | | 11/1998 | Yamano et al. | |
| 6,138,466 A | | 10/2000 | Lake et al. | |
| 6,230,834 B1 | | 5/2001 | Van Hout et al. | |
| 6,315,069 B1 | | 11/2001 | Suba et al. | |
| 6,394,210 B2 | | 5/2002 | Matsuda et al. | |
| 6,523,634 B1 | * | 2/2003 | Gagnon et al. ............ | 180/291 |
| 6,662,891 B2 | * | 12/2003 | Misu et al. ................ | 180/68.1 |
| 2004/0062955 A1 | * | 4/2004 | Kubota et al. ............. | 429/9 |
| 2004/0074681 A1 | * | 4/2004 | Ono et al. ................. | 180/65.1 |
| 2004/0079570 A1 | * | 4/2004 | Mizuta ...................... | 180/65.8 |
| 2005/0011692 A1 | * | 1/2005 | Takahashi et al. ......... | 180/68.5 |

FOREIGN PATENT DOCUMENTS

| | | | |
|---|---|---|---|
| JP | 58-161670 | * | 9/1983 |
| JP | 2-17403 | * | 7/1990 |
| JP | 2001-18694 | * | 1/2001 |
| JP | 2001-233064 | * | 8/2001 |
| JP | 2001-354039 | * | 12/2001 |
| JP | 2003-182377 | * | 7/2003 |
| JP | 2003-306045 | * | 10/2003 |

* cited by examiner

Primary Examiner—Bryan Fischmann
(74) Attorney, Agent, or Firm—Ralph E. Smith

(57) ABSTRACT

A vehicle battery mounting method and thermal regulation system eliminate seat removal during battery maintenance and costly seat modifications. The thermal regulation system maintains the battery at a desired temperature range to encourage efficient charging and prolonged battery life.

2 Claims, 2 Drawing Sheets

INTERIOR VEHICLE BATTERY SYSTEM AND METHOD

FIELD OF THE INVENTION

The present invention relates to vehicle batteries and more particularly, to an under seat mounting method and thermal regulation system for a vehicle battery.

BACKGROUND OF THE INVENTION

The dynamics of the automobile market have caused manufacturers to locate the vehicle battery within the interior of the vehicle. Space constraints within the interior compartment provide that the battery displace as little space as possible. This in turn results in the packaging of the battery within a very confined space. One of the most utilized areas for locating a battery within the interior compartment is under the occupant seat. In this location, the battery is required to satisfy two opposing requirements. The first is to ensure that the battery is sufficiently enclosed to prevent the occupant from accidentally contacting the electrical terminals. The second is to limit the amount of enclosure to allow sufficient air flow for heating and cooling of the battery and to allow battery generated heat to escape from under the seat to prevent heat build-up which could prove uncomfortable to the occupant. Battery performance and longevity are dependant upon the thermal environment. Temperature extremes degrade battery performance and high temperature environments shorten battery life.

A standard approach for mounting a battery under the seat of a vehicle is to install the battery prior to seat installation. The battery is inserted and latched in a vertical direction into a special battery container which structurally encloses the battery. The seat is then positioned above the battery and affixed to the vehicle. Service procedures involving the battery require seat removal.

Another known vehicular under seat battery mounting method is to create a special seat, sill and floor structure which allows the battery to be slid into position under the seat. This method does not require seat removal for service involving the battery. However, significant floor, sill and seat designs are required to effect this side opening under a seat.

SUMMARY OF THE INVENTION

The present invention allows ease of battery service without requiring seat removal or major redesign to current and standard seat design practices. The new battery installation method involves sliding the battery into position under the seat in a fore and aft direction and then securing the battery into position utilizing a retaining bracket or strap. Minor design adjustments to an existing seat includes a forward facing seat riser opening large enough to allow passage of the battery. The retaining bracket or strap constrains the battery in the upward and forward direction. This packaging approach allows the battery to be removed and replaced easily. In this manner, the vehicle's cabin heating and cooling system will be allowed to regulate the battery temperature. Battery temperature is maintained in a range that is favorable to charging efficiency and battery life. The components are designed in such a way as to utilize as much of the vehicle's existing architecture with minimal modification of existing components to encapsulate the battery while allowing adequate ventilation and preventing accidental occupant contact with electrical terminals.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
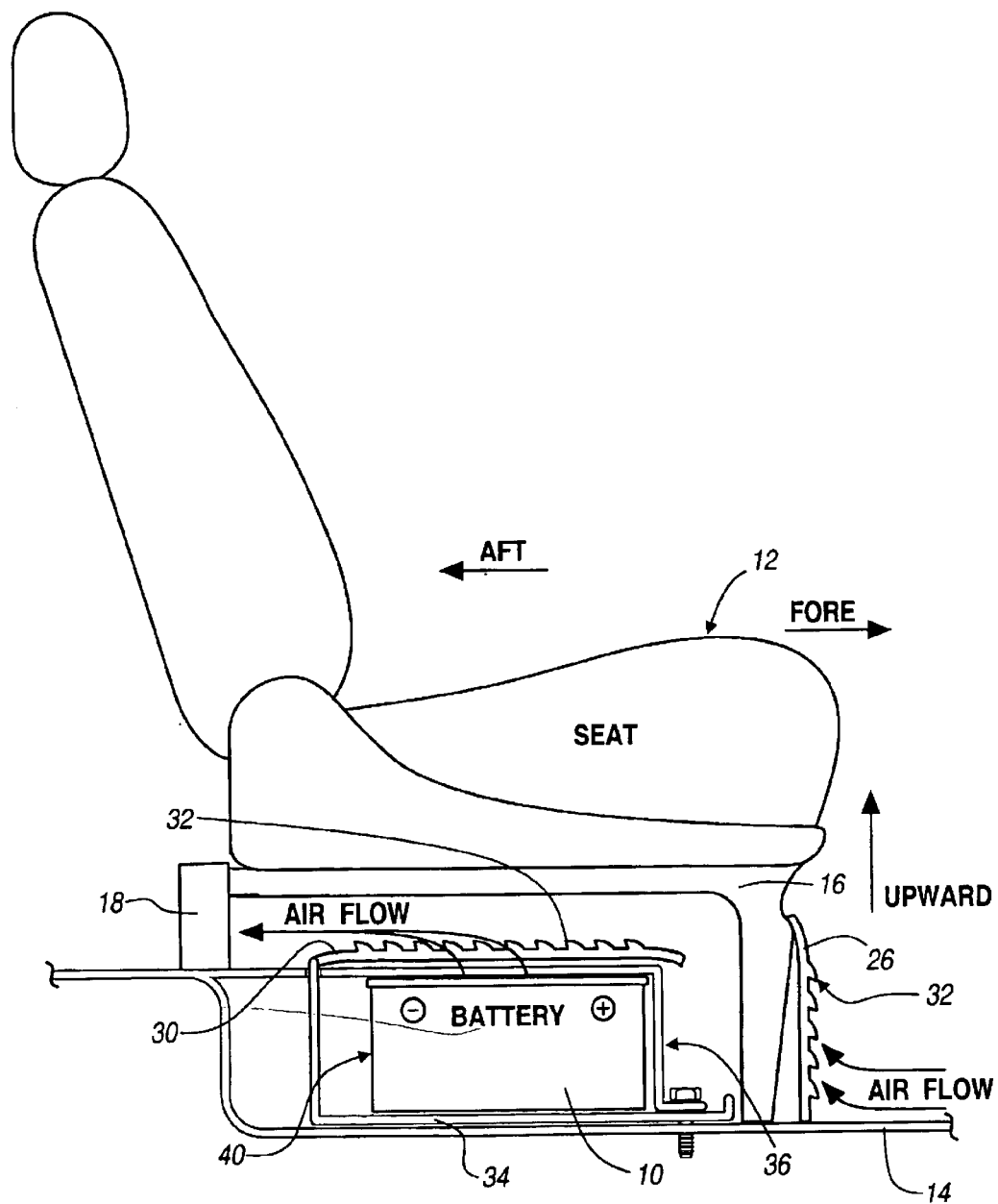
FIG. 1 is a side view of the apparatus in accordance with the present invention.

Referring to FIG. 1, a battery 10 is located under a vehicle seat 12. Seat 12 is attached to vehicle floor structure 14 via front seat mounting structure 16 and rear seat mounting structure 18.

Figure 2:
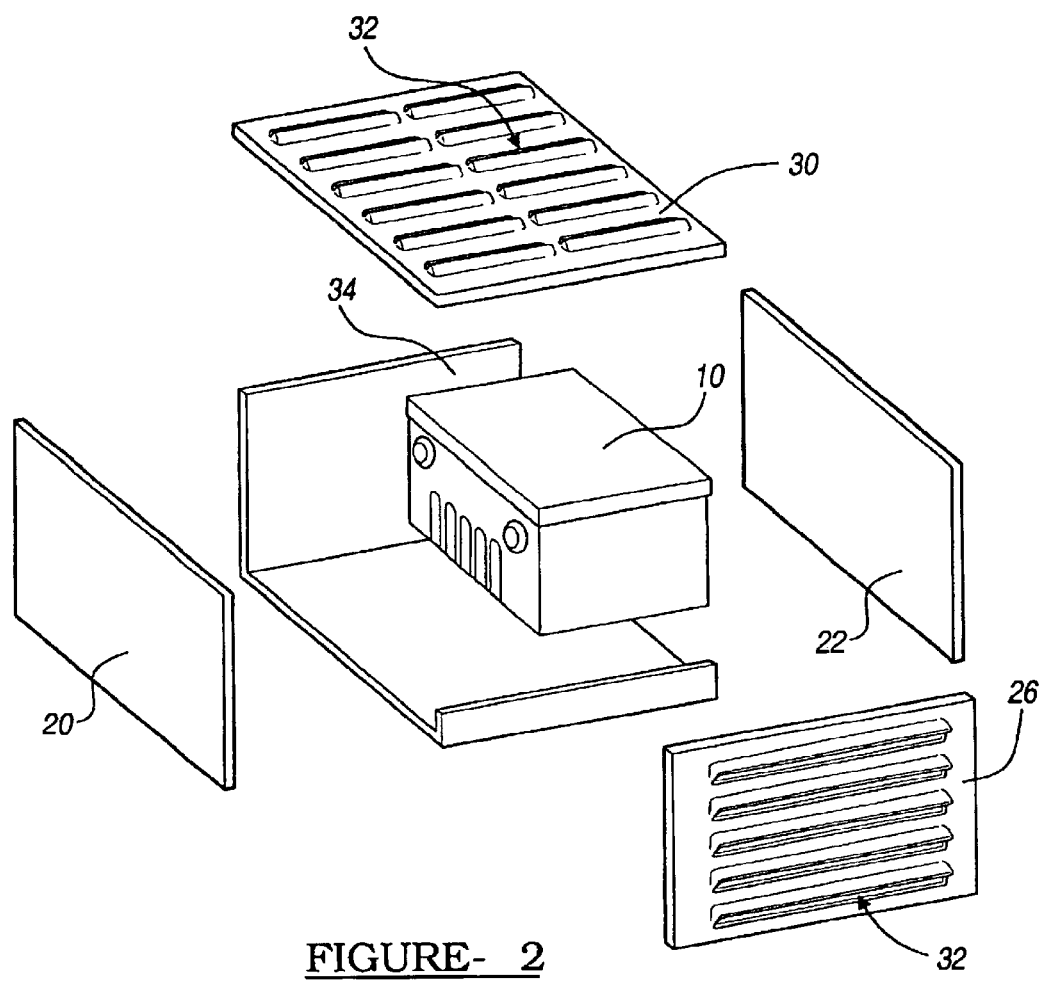
FIG. 2 is an exploded prospective view of the apparatus in accordance with the present invention.

With reference to FIG. 2, outboard trim side shield 20 and inboard trim side shield 22 are attached to seat 12. Louvered front trim shield 26 is attached to the fore side of outboard trim side shield 20 and inboard trim side shield 22.

A louvered top cover 30 is located above battery 10 and under seat 12. Louvered top cover 30 is sufficiently spaced from battery 10 to allow air flow through louvers 32 from the surface of battery 10. Top cover 30 is also sufficiently spaced from seat 12 to allow air to flow through louvers 32 and between top cover 30 and seat 12. Thus provided, heat generated from battery 10 will naturally rise with ambient air through louvers 32 in louvered top cover 30. This heated air will pass under seat 12 and flow into the vehicle environment. This flow of air from battery 10 through louvered top cover 30 will encourage air flow through louvered front trim shield 26 toward battery 10.

While the above description details a preferred embodiment with one louvered trim shield, it would be understood by one of ordinary skill in the art that multiple trim shields could be provided with louvers to effect the desired heat regulating air flow.

Battery 10 is placed on battery tray 34. Retaining device 36 limits motion of battery 10 relative to battery tray 34. Battery tray 34 contacts the bottom surface of battery 10 and encloses the aft side 40 of battery 10. As shown in FIG. 1, retaining device 36 is a strap that attaches to the aft side of battery tray 34, contacts the upward side of battery 10, and attaches to the fore side of battery tray 34. In an alternate embodiment, retaining device 36 is a retaining bracket that contacts a ledge on the lower portion of a battery in accordance with the method disclosed in commonly-owned U.S. Pat. No. 6,230,834.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A ventilating system for a battery mounted under a vehicle seat comprising;

a top cover for said battery having louvers therein for permitting air flow upwardly therethrough; and a front trim shield for said battery having louvers therein for permitting air flow rearwardly therethrough, whereby air may flow through the front trim shield against the battery and then upwardly out through the top cover.

2. The ventilating system of claim 1 further comprising:

a battery tray adapted to contact a bottom surface and an aft surface of the battery; and a battery retaining device coupled to an aft side of the battery tray and adapted to be in contact with an upward facing surface of the battery and removably coupled to a front side of the battery tray, whereby the battery is insertable under and removable from under the vehicle seat without a need for moving the seat.

* * * * *